S. T. KRONENBERG.
SPRING WHEEL.
APPLICATION FILED MAR. 12, 1912.
1,101,195.
Patented June 23, 1914.
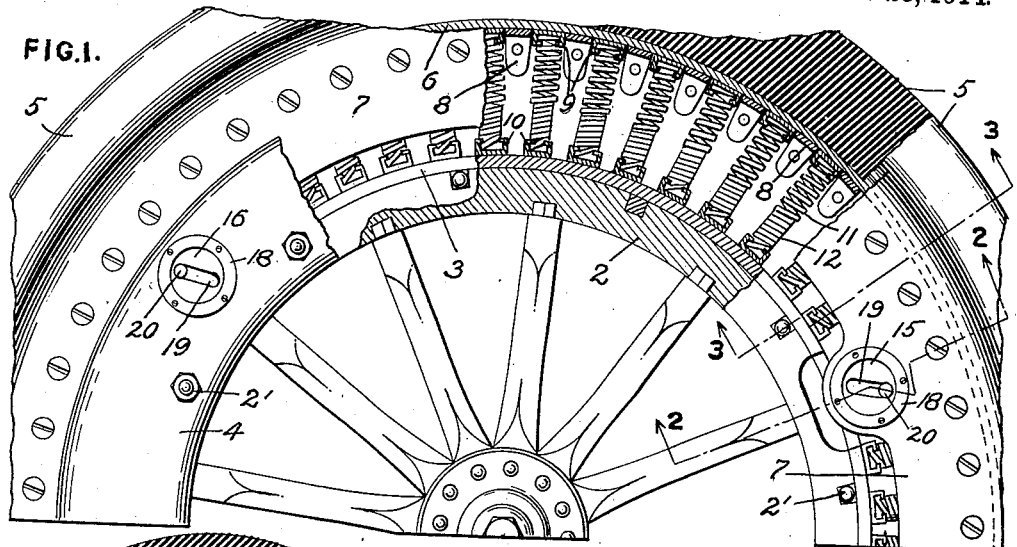
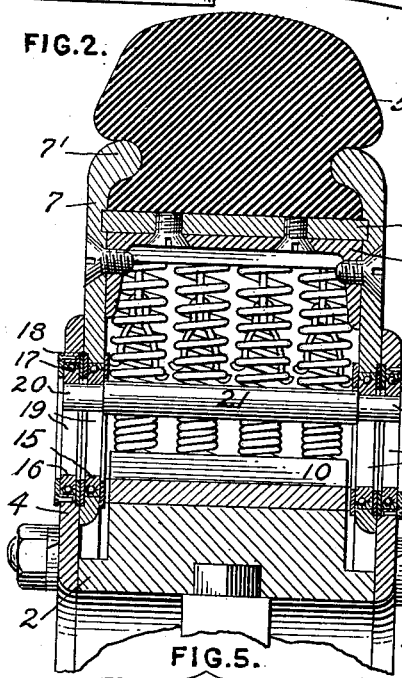
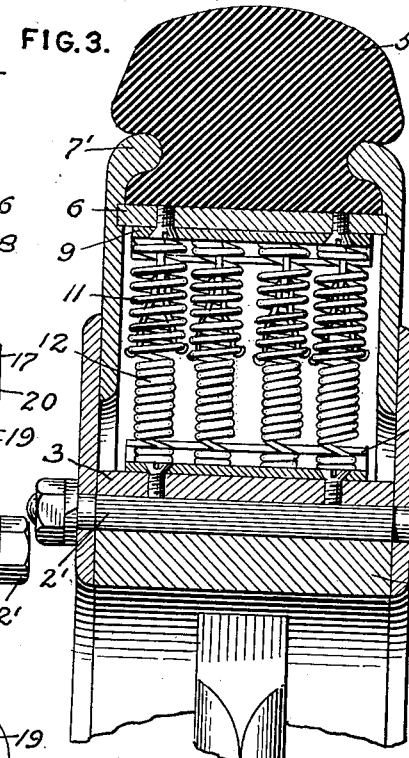
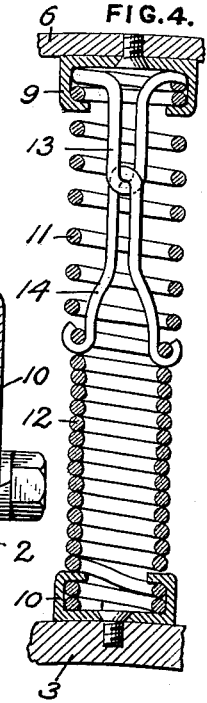
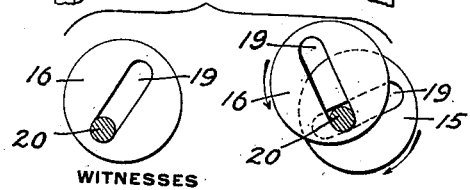
WITNESSES
INVENTOR

UNITED STATES PATENT OFFICE.

SAMUEL T. KRONENBERG, OF PITTSBURGH, PENNSYLVANIA, ASSIGNOR OF FIFTY-FIVE ONE-HUNDREDTHS TO JOHN C. WOLFRAM, OF PITTSBURGH, PENNSYLVANIA.

SPRING-WHEEL.

1,101,195. Specification of Letters Patent. Patented June 23, 1914.

Application filed March 12, 1912. Serial No. 683,289.

*To all whom it may concern:*

Be it known that I, SAMUEL T. KRONENBERG, a resident of Pittsburgh, in the county of Allegheny and State of Pennsylvania, have invented certain new and useful Improvements in Spring-Wheels, of which the following is a specification.

This invention relates to a resilient rim or tire for vehicle wheels of the type wherein cushion springs are interposed between a wheel body and a movable or compensating tread-carrying rim, and one object is to provide improved springs of such double or compound form that one portion thereof provides the cushioning effect when the rim is under compression, and the other portion opposes undue expansion or rebound, such as may follow after passing over a rut or obstruction.

A further purpose is to provide an efficient compensating connection between the radially movable rim and wheel body for resisting circumferential strains or torque caused by the tendency of said parts to turn relatively to each other. For instance, the driving force imparted to the rear wheels of an automobile would tend to rotate the wheel bodies within their rims in the absence of a suitable force transmitting connection with the tread portions. The means herein proposed accomplishes this in an efficient manner without interfering with the necessary radial movement or play.

In the accompanying drawings, Figure 1 is a view partly in side elevation and partly in section of a portion of a wheel rim constructed in accordance with the invention. Figs. 2 and 3 are cross sections on lines 2—2 and 3—3, respectively, of Fig. 1. Fig. 4 is a detail of one of the springs and the spring-holding means. Fig. 5 is a detail of the compensating connection between the wheel body and rim.

Referring to the drawings, 2 designates the body of the wheel to which is secured an outwardly disposed channel, 3 being the channel base, and 4 the opposite ring-like side plates thereof, the latter secured to the wheel body by transverse bolts 2'. Tread 5 of any suitable construction is carried by an outer channel which consists of a rim-like plate 6 which forms the base for tread 5; and the opposite ring-like side plates 7 which are secured together by the U-shaped brackets 8. Plates 7 may be extended to provide the tread-forming grips 7'. The outer channel as thus formed is movable radially of the channel carried by the wheel body, in the present adaptation side plates 7 of the outer channel fitting and slidable between plates 4 of the inner channel.

Arranged in the space between the channels are the cushioning elements in the form of coiled springs which are preferably arranged radially of the rim and spaced apart circumferentially. The springs are in rows transversely of the rim, and the coil convolutions at the outer ends of the springs of each row are secured within a transverse channel 9 fastened to rim 6 between brackets 8. The convolutions at the inner ends of the springs are similarly held in channels 10 secured to rim plate or channel base 3 of the wheel body.

The springs are so constructed as to oppose compression and thereby provide a cushioning effect, and also to oppose undue expansion, thereby checking the rebound and guarding against breaking strains. This is accomplished by making a portion of the length of each spring, preferably its outer portion, of open and compression-opposing form, as indicated at 11, while the remainder of the coil length is of closed form as indicated at 12 for opposing undue expansion.

To guard against excessive expansion of the contraction opposing portion 11, the two parts of the spring are so connected as to limit the expansion of part 11 without interfering with its contraction. In the present adaptation this is accomplished by the two links 13 and 14 looped together within the coil as shown in Fig. 4. A desirable arrangement is to have link 13 formed of a continuation of the wire of which the coil is formed. The extremities of link 14 are secured to the coil at the juncture of the two spring portions.

With the spring elements constructed as described, the coil parts 11 cushion the wheel when passing over ruts or obstructions, said spring parts 11 at the under part of the wheel compressing, while the same movement of the wheel body exerts a tension on part 12 of the springs at the top of the wheel, this without unduly expanding parts 11 of the last mentioned springs. It is thus quite impossible for the compression-resisting portions 11 to be subjected to undue expansion strains, and breaking of the springs is practically precluded. Said spring parts can expand only so far and then the whole strain is imparted through the connecting links to the expansion-resisting portions 12 of the coils. The arrangement is such, however, that the compression of portions 11 is not interfered with.

The connection between the wheel body and the movable rim for taking care of the circumferential strains without interfering with the necessary radial play is embodied in pairs of circular heads, one head of each pair carried by the outer rim, and the other by the wheel body.

In the adaptation shown in Figs. 1 and 2 heads 15 and 16 of each pair are in the form of circular disks, head 15 being rotatable in one of plates 7 of the outer channel, while head 16 is similarly rotatable in one of plates 4 of the wheel-body channel, the heads each mounted in ball bearings 17 and held in place by the rig-like plates 18. The heads of each pair are slotted, preferably radially, as indicated at 19, and are connected by pin 20 which extends through the slots. Normally, the pin is in eccentric position, although its relation with the disks may shift or vary under the relative movements of the connected parts. A desirable arrangement is that shown in Fig. 2, wherein pairs of heads are arranged at opposite sides of the rim and one rod 21 serves for the opposite pairs, the reduced extremities of this rod constituting the head-connecting pins 20 to which reference has been made. It will be understood, however, that the invention is not restricted to arranging the pairs of heads in opposite relation, nor to a head-connecting element which is common to pairs at opposite sides of the rim. The heads of the connecting devices are freely rotatable and hence readily respond to any shifting movement thereof resulting from the radial play of the rim parts. And the pin and slot connection between the heads prevent them from assuming such position as will interfere with the radial movement, but at the same time will prevent any relative circumferential movement, thus providing a connection that is practically unyielding circumferentially of the wheel with the result that all forces are transmitted from the wheel body to the compensating rim, or vice versa, without exerting strain on the interposed spring elements.

I claim:—

1. A spring of coil form for opposing expansion and contraction, a portion of the spring being of open form for opposing compression and another portion thereof of a form to oppose expansion, and means for limiting the expansion of the compression-opposing portion of the spring.

2. A spring of coil form for opposing expansion and contraction, a portion of the length of the spring being of open form for opposing compression, and another portion of the length thereof being of closed form to oppose expansion.

3. A spring of coil form for opposing expansion and contraction, a portion of the length of the spring being of open form for opposing compression and another portion of the length thereof being of a form to oppose expansion, and means connecting the two spring portions for limiting the expansion of the compression-opposing portion without interfering with such compression.

4. A spring of coil form for opposing expansion and contraction, a portion of the length of the spring being of open form for opposing compression and another portion of its length being of a form to oppose expansion, and two links looped together within the coil and movable longitudinally of each other when the spring is compressed, one link connected to the compression-opposing portion of the spring and the other link connected to the expansion opposing portion for limiting the expansion of the compression-opposing portion.

5. A spring of coil form for opposing expansion and contraction, a portion of the length of the spring being of open form for opposing compression and another portion of its length being of a form to oppose expansion, and two links looped together within the coil and movable longitudinally of each other when the spring is compressed, one link consisting of a looped continuation of the extremity of the compression-opposing portion of the spring and the other link having its extremities connected to the expansion-opposing portion for limiting expansion of the compression-opposing portion.

In testimony whereof I affix my signature in presence of two witnesses.

SAMUEL T. KRONENBERG.

Witnesses:
J. M. NESBIT,
ELLA McCONNELL.